United States Patent [19]

Wilson et al.

[11] Patent Number: 5,509,448
[45] Date of Patent: Apr. 23, 1996

[54] CONTROL VALVE WITH INTEGRAL ACCUMULATOR

[75] Inventors: Thomas H. Wilson, Indianapolis; Phillip F. McCauley, Zionville, both of Ind.

[73] Assignee: General Motors Corporation, Detroit, Mich.

[21] Appl. No.: 339,625

[22] Filed: Nov. 15, 1994

[51] Int. Cl.[6] .............................................. F15B 13/044
[52] U.S. Cl. .................. 137/625.64; 192/109 F; 251/47
[58] Field of Search ................... 137/625.64; 192/109 F; 251/47

[56] References Cited

U.S. PATENT DOCUMENTS

| | | | |
|---|---|---|---|
| 4,875,501 | 10/1989 | Ichihashi et al. | 137/625.64 |
| 5,031,663 | 7/1991 | Fukuta et al. | 137/625.64 |
| 5,042,832 | 8/1991 | Takahashi et al. | 137/625.64 X |
| 5,121,769 | 6/1992 | McCabe et al. | 137/625.64 X |
| 5,129,500 | 7/1992 | Potter et al. | 192/109 F |
| 5,174,338 | 12/1992 | Yokota et al. | 137/625.64 |
| 5,184,644 | 2/1993 | Wade | 137/625.64 |

FOREIGN PATENT DOCUMENTS 4-205508  7/1992  Japan ............................. 137/625.64

*Primary Examiner*—Gerald A. Michalsky
*Attorney, Agent, or Firm*—Donald F. Scherer

[57] ABSTRACT

An engagement control valve for a fluid operated torque transmitter, such as a clutch, has a pulse width modulated (PWM) solenoid, a valve spool and an accumulator. The PWM solenoid supplies control pressure through a flow restrictor to a control chamber adjacent one end of the valve spool which responds by establishing a proportionate engagement pressure for the torque transmitter. The accumulator has a piston slidably disposed in the valve spool, adjacent the control chamber, for fluid communication with the control pressure from the PWM solenoid. A damping chamber is formed adjacent the other end of the valve spool and is in fluid communication with an exhaust port via a flow restrictor.

2 Claims, 1 Drawing Sheet

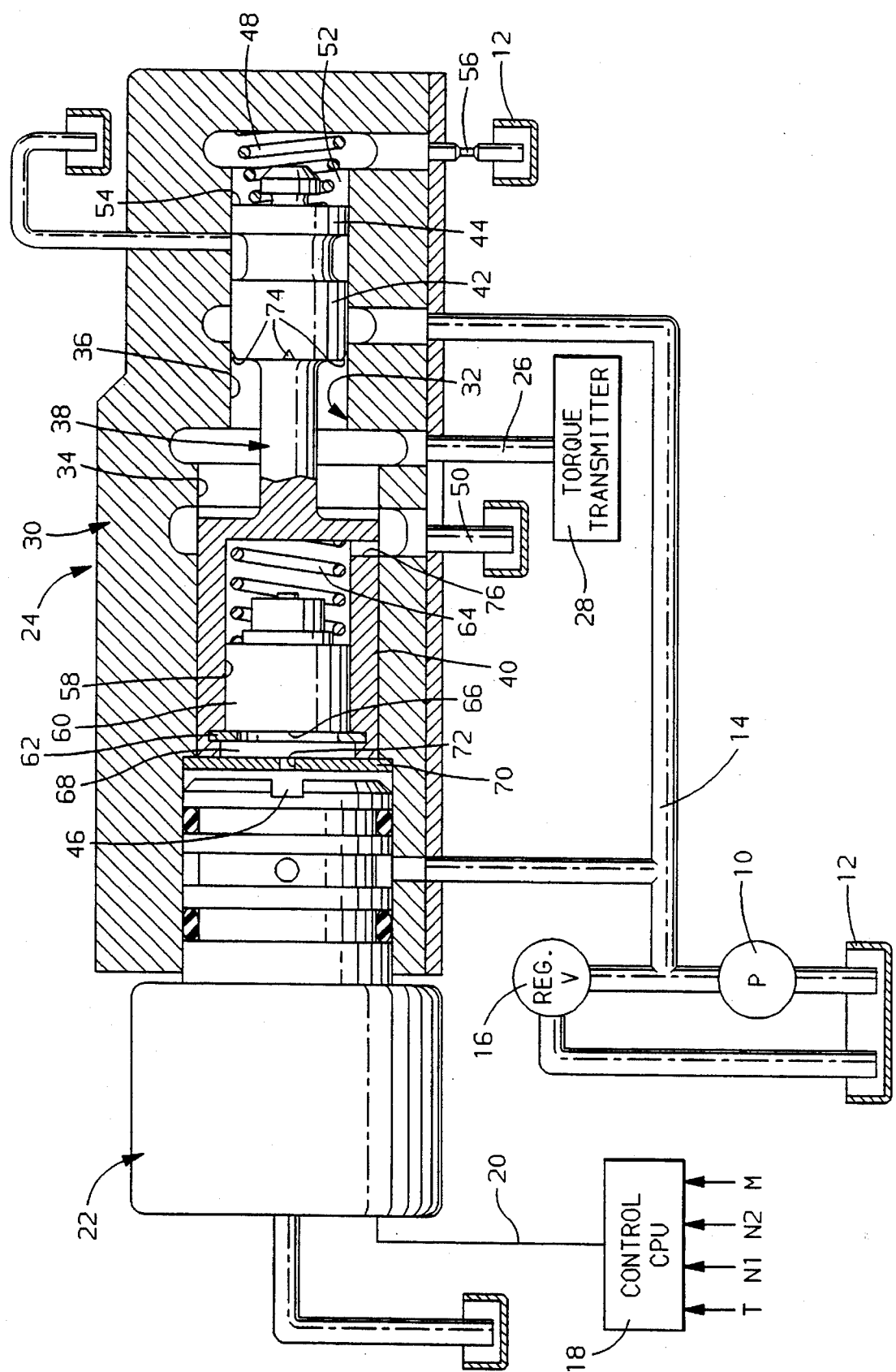

CONTROL VALVE WITH INTEGRAL ACCUMULATOR

TECHNICAL FIELD

This invention relates to control valves, and more particularly, to hydraulic control valves for controlling the engagement pressure of a torque transmitting device.

BACKGROUND OF THE INVENTION

In power shifting transmissions, a fluid operated friction torque transmitter, such as a clutch or brake, is actuated during a ratio interchange. When electronic controls are utilized, the engaging pressure is generally controlled by a solenoid operated valve. To reduce the cost, a simple pulse width modulated (PWM) solenoid is used. These devices control the pressure in response to the duty cycle imposed on the solenoid coil. The resulting pressure has an AC component of approximately 60 Hz and a DC component proportional to the main system pressure as determined by the duty cycle.

The AC component can induce pressure pulsations at the torque transmitter, such that a vibratory motion can result in noise or a transient vibration sensed by the operator during the ratio interchange. To alleviate this condition, it is common practice to position an accumulator of significant size downstream of the control valve in parallel flow relation with the torque transmitter. This requires additional space and sufficient fluid during the ratio interchange to fill the accumulator resulting in increased size of the transmission envelope and the fluid necessary to complete the shift.

When space availability is limited, one or more wave springs can be used in the torque transmitter engaging mechanism, or a more expensive proportional solenoid valve and control unit can be used. These solutions, while quite effective, result in increased cost of production.

SUMMARY OF THE INVENTION

It is an object of the present invention to provide an improved valve, wherein an accumulator and flow control restriction are disposed within a valve spool of the valve and between the control solenoid and the valve spool respectively.

It is another object of this invention to provide an improved valve having a PWM solenoid supplying control pressure to a control chamber on a regulating valve spool, wherein an accumulator and flow restriction control the pressure rise in the control chamber and another flow restriction is operative to cooperate in effecting damping of the valve spool.

It is a further object of this invention to provide an improved PWM solenoid operated engagement control valve, wherein a flow restriction is disposed between the PWM output pressure and the control chamber of a valve spool in the engagement control valve to reduce the transient torque pulses originating at the PWM solenoid.

These and other objects and advantages of the present invention will become more apparent from the following description and drawing.

DESCRIPTION OF THE DRAWING

The drawing is a cross-sectional elevational view partly in schematic representing an engagement control valve structure and a portion of a hydraulic control system.

DESCRIPTION OF AN EXEMPLARY EMBODIMENT

As seen in the drawing, there is a conventional positive displacement pump 10 which draws pressure from a sump or reservoir 12 for delivery to a main pressure passage 14. The pressure in passage 14 is controlled by a conventional pressure regulator valve 16 which may receive control signals from a conventional control CPU 18 which is utilized to establish the shift pattern and pressure regulation within the transmission, not shown. The control CPU 18 may be a digital or analog type processor of conventional design. This control 18 has imposed thereon a variety of signals which indicate the performance parameters of the vehicle being controlled, such as engine torque or transmission torque T, engine speed N1, vehicle speed N2 and the position of a conventional manual shift control valve M.

The control 18 supplies electrical energy or control signals via an electrical connection 20 to a conventional PWM solenoid 22. As is well known, the PWM solenoid 22 is effective to provide an output or control pressure proportional to the duty cycle at which the PWM solenoid operates. The control 18 establishes the duty cycle at which the PWM solenoid 22 will operate. The PWM solenoid 22 provides a control pressure for an engagement control valve 24.

The engagement control valve 24 is effective to receive fluid pressure from the main passage 14 and, in response to the signals imposed on the PWM solenoid 22, supply a controlled fluid pressure via a passage 26 to a conventional torque transmitter 28. The torque transmitter 28 may be either a fluid operated friction clutch or friction brake, the design and structure of these devices is well known within the art.

The engagement control valve 24, along with the PWM solenoid 22, also includes a valve body 30 in which is formed a stepped diameter valve bore 32 having a large diameter bore portion 34 and a smaller diameter bore portion 36. A valve spool 38 is slidably disposed in the valve bore 32. The valve spool 38 includes a large diameter land 40 slidably disposed in the valve bore portion 34 and a pair of spaced smaller diameter lands 42, 44 which are slidably disposed in the bore portion 36.

The passage 26 is disposed for fluid communication with the valve bore 32 essentially at the junction of the bore portions 34 and 36, such that the fluid pressure which will be admitted to passage 26 is effective on the differential area which is established by the difference in the diameters of lands 40 and 42.

As is well known with PWM type valves, the PWM solenoid 22 effects a fluid pressure in a control chamber 46 which may be transmitted to one end of the valve spool 38. This pressure causes the valve spool 38 to move against a valve control spring 48, such that the valve land 42 is moved sufficiently to open the passage 14 to the differential area between the lands 42 and 40. This pressure is directed via passage 26 to the torque transmitter 28.

When the fluid pressure acting on the differential area between lands 42 and 40 is sufficient to balance the control pressure established by the PWM solenoid 22, the valve spool 38 will move leftward, as seen in the drawing, against the pressure in the control chamber to partially close the passage 14 and partially open an exhaust passage 50 disposed adjacent the valve land 40 in the large diameter bore portion 34. The valve spool 38 will be positioned by the PWM solenoid 22 to permit sufficient fluid to enter and leave the valve bore via the passages 14, 26 and 50 to maintain the pressure established by the PWM solenoid 22.

The valve spring 48 is disposed in a damping chamber 52 which is open to an end 54 of the valve land 44 and through a flow restrictor 56 to the sump 12. The valve spool 38 has a bore 58 in which is slidably disposed an accumulator piston 60. The accumulator piston 60 is urged into abutment with a locking ring 62 by an accumulator spring 64. The accumulator piston 60 has a surface 66 which is disposed adjacent an accumulator control chamber 68.

The accumulator control chamber 68 is in fluid communication via an orifice plate or flow restrictor plate 70 with the control chamber 46 of the PWM solenoid 22. The plate 70 has formed therein a flow restrictor 72 which is effective to control the fluid flow between the chambers 46 and 68. The pressure in chamber 68 is, in fact, the control pressure which effects the positioning of the valve spool 38 during the controlled engagement of the torque transmitter 28. The fluid pressure that enters the control chamber 68 through the flow restrictor 72 is effective on the accumulator piston 60 to urge the accumulator piston 60 to move rightward against the accumulator spring 64, exhausting fluid via the flow restrictor 76, and thereby expanding the control chamber 68. This expansion of the control chamber 68, as is well known, will absorb pan of the pressure pulsations which might otherwise be transmitted by the fluid to the valve spool 38 and also affect the rate of pressure rise.

Likewise, the flow restrictor 72 is a known flow evening device which will also reduce the pressure pulsations emanating from the PWM solenoid 22. Since the valve spool 38 will move within the valve bore 36, any residual fluid in the damping chamber 52 will be exhausted. This exhausting takes place through the restrictor 56 which again effects some limitation on the vibratory energy that can be transmitted between the fluid and the valve spool 38.

From the foregoing, it should be apparent that the three structures; namely, the restrictor 72, the accumulator piston 60 and the flow restrictor 56 all cooperate to reduce the transient pressure vibrations or energy oscillations which might otherwise be transferred between the PWM solenoid 22 and the valve spool 38. Computer simulations of the pressure and flow characteristics have shown that the use of the flow restrictor 72 by itself will effect a fifty percent improvement in the transient pressure function. The combination of the two flow restrictors 72 and 56 will effect approximately seventy-five percent improvement in the transient torque spikes.

The accumulator comprised of the piston 60, spring 64 and bore 58 can be shown by computer simulation to effect a significant reduction in the transient torque spikes also. These torque spike reductions may be as high as seventy percent.

The accumulator function will provide a less rapid change in pressure at the torque transmitter interface thereby smoothing the engagement and disengagement which will occur during a ratio interchange or during a neutral-to-drive shift procedure. A further improvement, which might be undertaken, is the use of metering grooves 74 formed in the smaller diameter land 42. These metering grooves 74 are useful in alleviating the rapid opening and closing of a sharp edged valve land across a sharp edged valve port. Thus, the change in pressure in the passage 26 is more gradual when the metering grooves are utilized.

The computer simulations show that when all of these improvements are placed in a single engagement control valve, the reduction in pressure pulsations is significant. In some systems, this can result in insignificant pulsations at the friction interface, such that the resulting torque transmitter performance is similar or better than the use of an accumulator adjacent the torque transmitter or disposed in parallel flow relation in the passage 26 upstream of the torque transmitter 28. This would, of course, be the common practice in power transmissions.

The embodiments of the invention in which an exclusive property or privilege is claimed are defined as follows:

1. A valve and torque transmitter comprising:

solenoid controlled valve means for providing a fluid control pressure;

a valve bore having first and second bore portions of different diameters;

a valve spool slidably disposed in said valve bore having first and second valve portions having diameters complementary to the first and second bore portions respectively;

an outlet passage communicating between the bore, the valve spool and the torque transmitter;

a wall closing one end of the valve bore adjacent the first bore portion;

a first chamber disposed adjacent the second bore portion in fluid communication with the fluid control pressure provided by the solenoid valve means;

accumulator means including a cavity formed in the second valve portion and a piston disposed in the cavity for establishing a controlled pressure rise in the first chamber;

a second chamber formed between the first valve portion and the wall;

and first flow restriction means disposed between said solenoid valve means and said first chamber and second flow restriction means disposed adjacent the second chamber for independently controlling flow rates to and from said first and second chamber.

2. A valve and torque transmitter comprising:

a source of fluid pressure;

solenoid controlled valve means communicating with said source for providing a fluid control pressure;

a valve bore having a first bore portion communicating with said source and a second bore portion of different diameters communicating with said torque transmitter;

a valve spool slidably disposed in said valve bore having first and second valve portions having diameters complementary to the first and second bore portions respectively for providing a controlled pressure between said source and said torque transmitter;

a wall closing one end of the valve bore adjacent the first bore portion;

a first chamber disposed adjacent the second bore portion in fluid communication with the fluid control pressure provided by the solenoid valve means;

accumulator means including a cavity formed in the second valve portion and a piston disposed in the cavity for establishing a controlled pressure rise in the first chamber;

a second chamber formed between the first valve portion and the wall;

and flow restriction means disposed adjacent the second chamber for controlling flow rate to and from said second chamber.

* * * * *